United States Patent [19]

Allen et al.

[11] Patent Number: 4,849,821
[45] Date of Patent: Jul. 18, 1989

[54] PAGE CHECK FOR COPIER/PRINTERS

[75] Inventors: James D. Allen, Rochester; John R. Thompson, Webster, both of N.Y.

[73] Assignee: Eastman Kodak Company, Rochester, N.Y.

[21] Appl. No.: 131,613

[22] Filed: Dec. 11, 1987

[51] Int. Cl.⁴ .............................................. H04N 1/032
[52] U.S. Cl. .................................. 358/405; 358/406; 358/408
[58] Field of Search ................. 358/256, 257, 288, 285

[56] References Cited

U.S. PATENT DOCUMENTS

| | | | |
|---|---|---|---|
| 4,007,326 | 2/1977 | Bernsen | 358/280 |
| 4,200,861 | 4/1980 | Hubect et al. | |
| 4,248,525 | 2/1981 | Sterrett | |
| 4,300,169 | 11/1981 | Sato | 358/256 |
| 4,414,579 | 11/1983 | Dattilo | 358/286 |
| 4,437,122 | 3/1984 | Walsh et al. | |
| 4,545,031 | 10/1985 | Kobayashi | |
| 4,710,785 | 12/1987 | Mills | 358/300 |

Primary Examiner—Edward L. Coles, Sr.
Assistant Examiner—Jerome Grant, II
Attorney, Agent, or Firm—Milton S. Sales

[57] ABSTRACT

Apparatus and process for producing multi-sheet, collated copy sets of a multi-original document with apparatus for monitoring the copy sets for confirming that each copy set contains all of the sheets, and has no grossly skewed, or unwanted duplicate or blank sheets. First electrical information signals characteristic of the images on the originals and second electrical information signals characteristic of the images on the copy set sheets are compared to produce an error signal representative of differences therebetween. A malfunction of the copier/printer is indicated in response to error signals of at least a predetermined magnitude.

8 Claims, 4 Drawing Sheets

PAGE CHECK FOR COPIER/PRINTERS

BACKGROUND OF THE INVENTION

1. Field of the Invention

This invention relates generally to copier/printers, and more particularly to monitoring multi-sheet, collated copy sets of a multi-original document for confirming, for example, that each copy set contains all of the sheets, and has no grossly skewed, or unwanted duplicate or blank sheets.

2. Description of the Prior Art

In printers, it is known to monitor printed paper to produce electrical signals characteristic of the printed image, and to compare these signals to a standard signal to decide whether or not the printed image is acceptable. For example, U.S. Pat. No. 4,545,031, which issued on Oct. 1, 1985 to N. Kobayashi, discloses a printer wherein each print is electronically scanned to decide if printed sheets are identical to a standard sheet. The image signal from each print might be used as the standard for the next succeeding print, or an image signal from the first print produced can serve as a common standard for all succeeding prints.

While such a system is fine to assure that all prints are acceptably similar to each other, the system does not monitor a multi-sheet, collated copy set of a multi-original document for confirming, for example, that each copy set contains all of the sheets, and has no grossly skewed, or unwanted duplicate or blank sheets.

Commonly assigned, co-pending U.S. patent application Ser. No. 090,308, filed Sept. 14, 1987 in the name of B. H. Mills (which application is a divisional application of U.S. patent application Ser. No. 940,832 filed Dec. 12, 1986) discloses a process control system for electrostatographic copier/printers wherein an electrical signal characteristic of the image on an original document is used to create a copy of the original. If the operator deems the copy quality unacceptable, the copy sheet is scanned and the electrical signal generated is compared to that of the original. Any differences between the two electrical signals are used to adjust the image process control parameters of the copier/printer.

While the process control system of the Mills application provides a useful method for adjusting the electrostatographic process of a copier/printer, it does not monitor a multi-sheet copy set of a multi-original document for confirming, for example, that each copy set contains all of the sheets, has no grossly skewed, or unwanted duplicates or blank sheets.

SUMMARY OF THE INVENTION

It is an object of the present invention to provide a copier/printer for producing multi-sheet, collated copy sets of a multi-original document with apparatus for monitoring the copy sets for confirming that each copy set contains all of the sheets, and has no unwanted duplicate or blank sheets.

In accordance with that object, the present invention provides apparatus and process for producing multi-sheet, collated copy sets of a multi-original document, wherein a set of electrical information signals characteristic of the images on the originals is received and stored. A second set of electrical information signals characteristic of the images on the copy set sheets is created and compared to the first electrical information signal set to produce an error signal representative of differences therebetween. A malfunction of the copier/printer is indicated in response to error signals of at least a predetermined magnitude.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

To assist in understanding the present invention, it will be useful to consider an electrostatographic copier having a logic and control unit (LCU) and a circulating document feeder. It will be noted that although the invention is suitable for use with a copier with hard copy originals fed from a circulating feeder it may also be used with other types of feeders, and indeed is applicable to printers wherein original documents are received as electronic signals from computers, work stations, etc.

Figure 1:
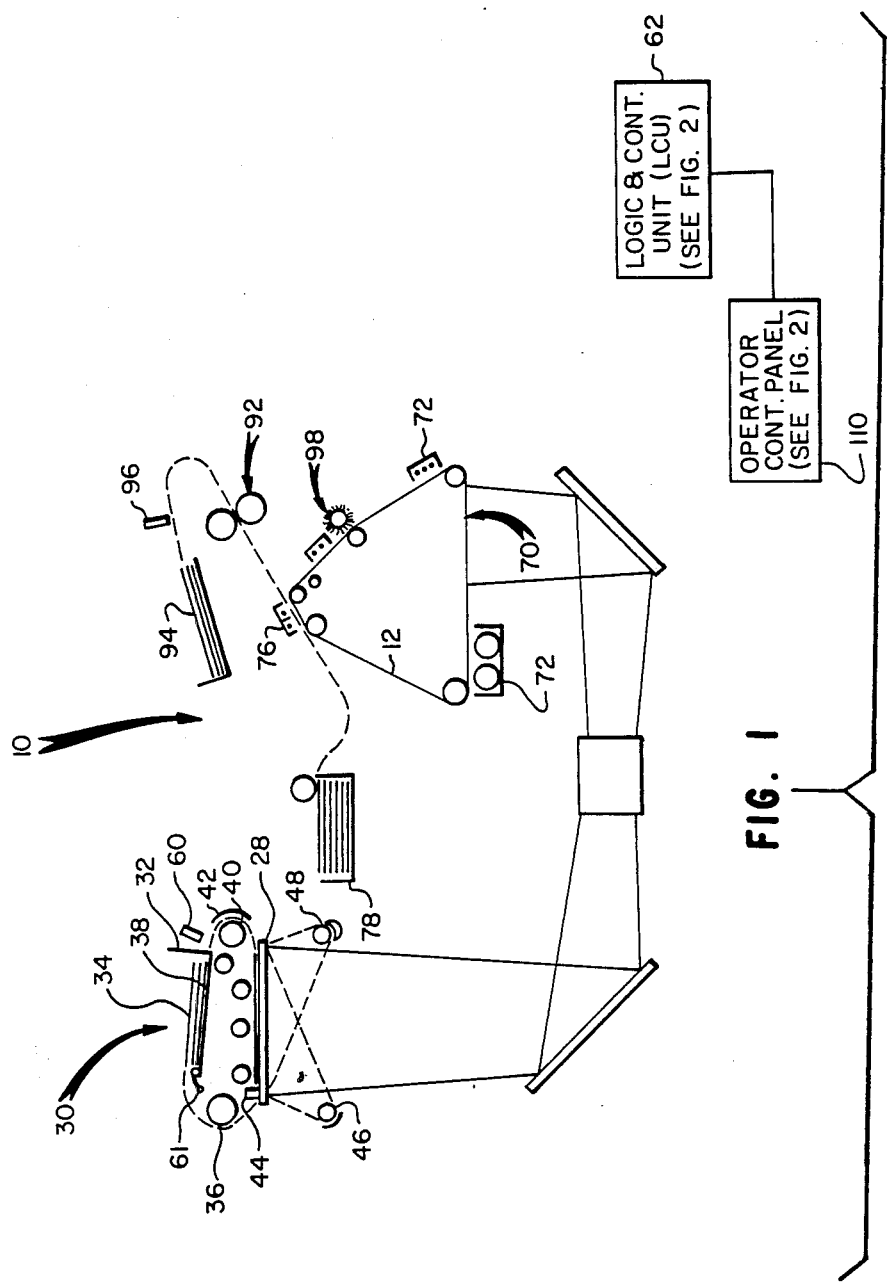
FIG. 1 is a schematic representation of an electrostatographic copier according to a preferred embodiment of the present invention.

Referring now to FIG. 1, there is shown an electrostatographic copier 10 having a photoconductive belt 12 moved in a clockwise direction, as illustrated. A circulating document feeder 30 has a receiving position such as a tray 32 for receiving a multi-original document and for sequentially circulating the originals from the bottom of tray 32 to an exposure platen 28. This is effected by means of a feed roller 38 which feeds the bottom most original in tray 32 between a guide roller 40 and a plate 42 onto platen 28, where the original is stopped by a gate 44. More details of the operation and structure of feeder 30 are disclosed in commonly assigned U.S. Pat. No. 4,099,860.

After the original is exposed by a pair of flash lamps 46 and 48, gate 44 is moved out of path 36, and original 34 is moved back to the top of the original set in tray 32. As an original 34 moves along path 36 away from tray 32, a low resolution scanner 60 generates an electrical information signal characteristic of the image on the original. The information signal is applied to a logic and control unit 62. A set-separator finger 61 is also provided for resting on the top of a set and for indicating when the entire multi-original document has been circulated by feeder 30.

When an original has been flash illuminated by flash lamps 46 and 48, an image is projected onto belt 12 at an exposure station 70 to form a latent electrostatic image. The latent electrostatic image is developed with toner at a magnetic brush developing station 72. As the toner image approaches a transfer station 76, a copy sheet is fed from a supply 78 into registration with the toner image on belt 12. The copy sheet is then transported to a fusing station 92 and to an output tray 94.

As the copy sheet moves between fusing station 92 and output tray 94, a low resolution scanner 96 generates an electrical information signal characteristic of the image on the copy sheet. The information signal is applied to LCU 62. Finally, a cleaning station 98 removes any residual toner from belt 12 so that is ready for another electrophotographic cycle.

Figure 2:
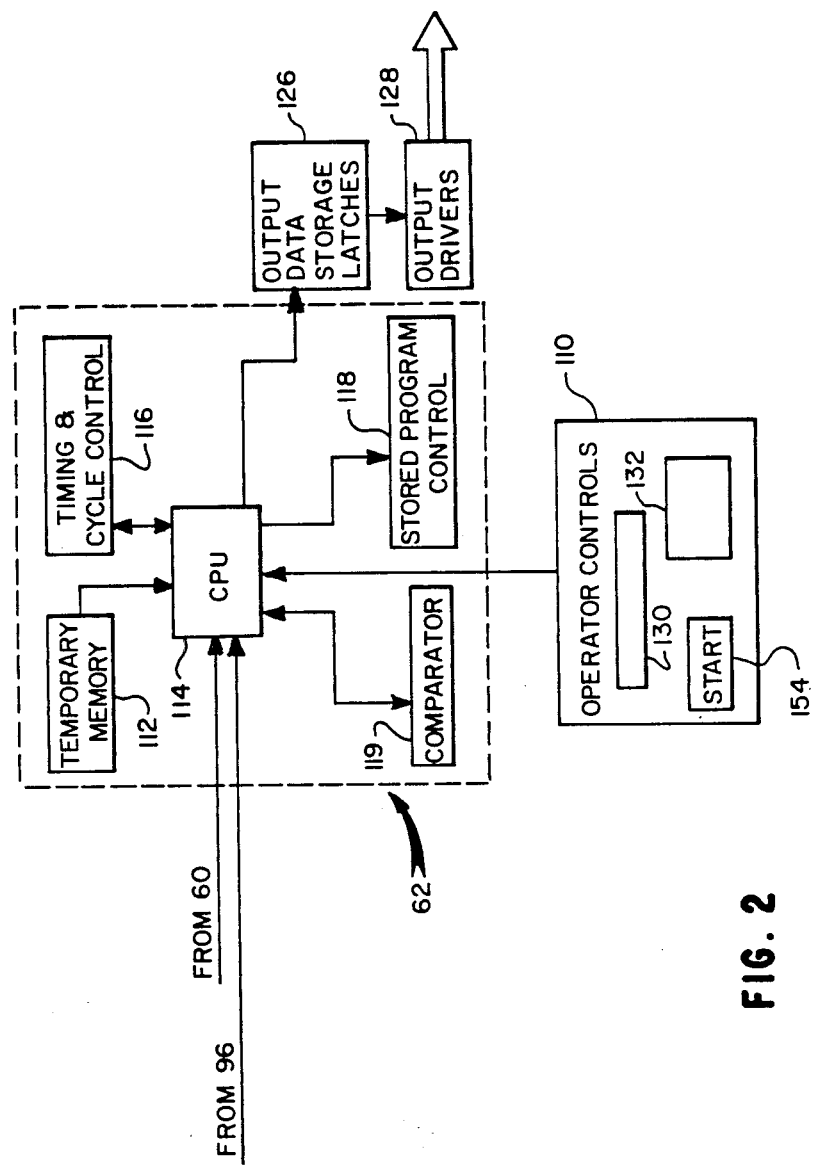
FIG. 2 is a more detailed block diagram of a logic and control unit in the copier of FIG. 1.

FIG. 2 shows greater detail of LCU 62, to which is connected an operator control panel 110. LCU 62 has a programmable computer such as a microprocessor which has a stored program responsive to input signals for sequentially actuating the various instrumentalities of copier 10 and feeder 30 as well as for controlling the operation of many other functions of copier 10 (as disclosed in greater detail in U.S. Pat. No. 3,914,047).

Programming of a number of commercially available microprocessors is a conventional, well understood skill. The following disclosure is written to enable a programmer having ordinary skill in the art to produce an appropriate control program for a microprocessor. The particular details of any such program would, of course, depend on the architecture of the designated microprocessor.

LCU 62 includes a temporary data storage memory 112, a central processing unit 114, a timing and cycle control unit 116, a stored program control unit 118 and a data comparator 119. Data input and output is performed sequentially under program control and the output data and control signals are applied to output data storage latches 126. Latches 126 provide inputs to suitable output drivers 128, which are connected to various copier and feeder instrumentalities.

Operator control panel 110 includes a plurality of operator actuatable switches or buttons, only two of which are shown, and a display 130. Copier 10 may be operated in either a monitor or non-monitor mode, as will be explained below. If the monitor mode is desired, then a button 132 is depressed.

Figure 3:
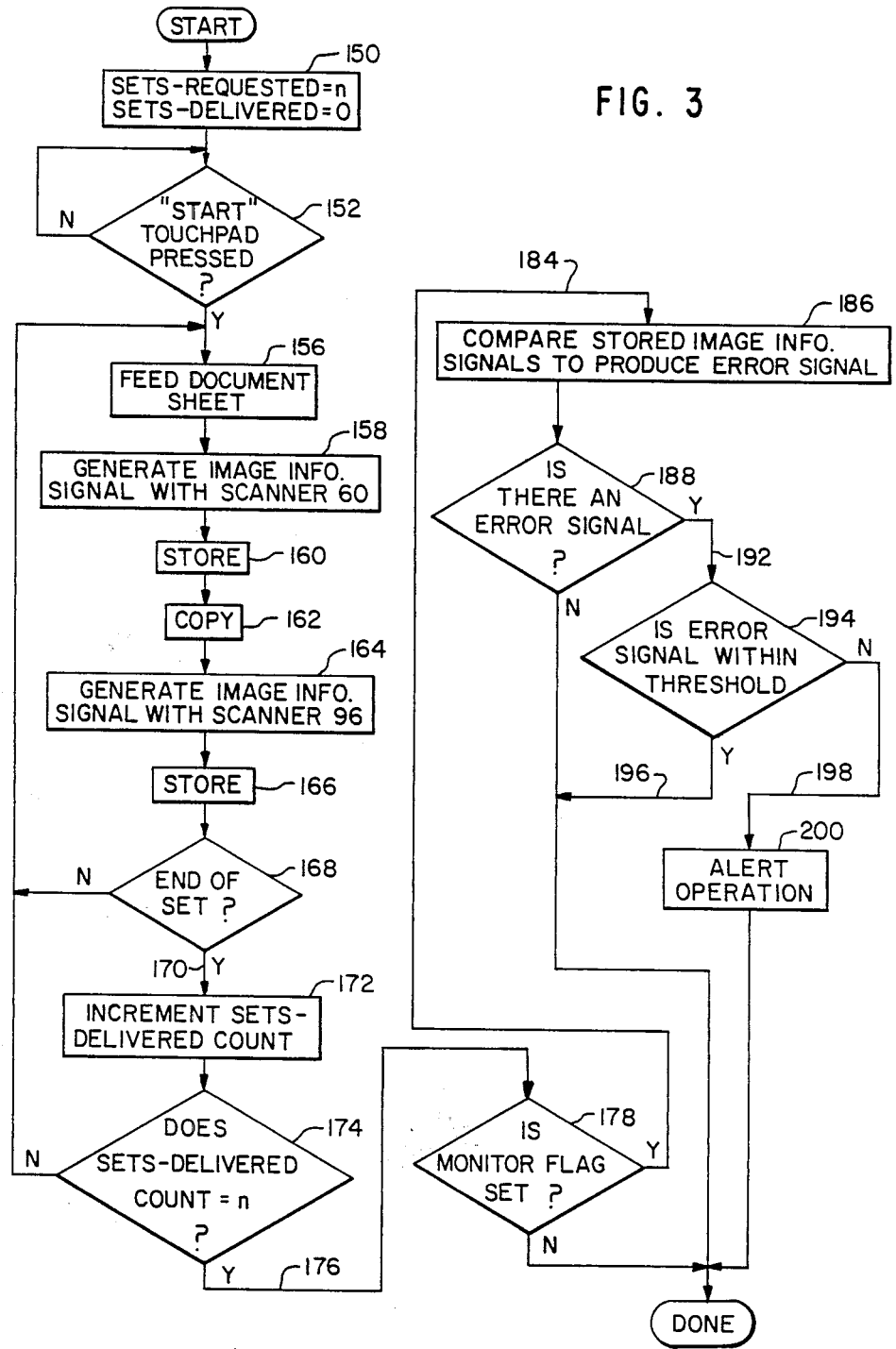
FIG. 3 is a flowchart of the process by which the copier of FIG. 1 operates.

Reference is made to FIG. 3, which is a logic flow chart showing the steps for monitoring the copy sets produced, such that the operator is assured that the sets contain all of the sheets, have no duplicate sheets, and have no blank sheets. A conventional microprocessor, a programmable logic array, or discrete logic could be implemented to perform the functions shown in the flowchart.

In FIG. 3, a function block 150 requires that a request be made for a specific number n of copy sets, and that the count of copy sets which have been delivered be reset to zero. A decisional block 152 causes the algorithm to await a command to begin.

After the "start" touchpad is pressed (154 in FIG. 2), the algorithm enters a function block 156 and the bottom sheet of the original document set in circulating feeder is advanced to platen 28. As the sheet passes scanner 60, an electrical image information signal is generated, as depicted by a logic function block 158. Function block 160 stores the signal in temporary memory 112.

The algorithm enters a function block 162, and the original is copied, with scanner 96 generating an electrical image information signal of the copy sheet to be stored in the temporary memory, as specified by function blocks 164 and 166.

In decisional block 168, the system tests to determine whether each of the originals of the document set have been copied. If not, the algorithm loops up to function block 156. The decision is made in a known manner such as by conventional set-separator finger 61.

If the decision from decisional block 168 is "yes" instead of "no," then the logic exits block 168 along a path 170 into a function block 172. In block 172, the delivered-sets count is incremented, and is used in a decisional block 174 to determine if the desired number of copy sets have been made. If not the algorithm loops up to function block 156.

If the decision from decisional block 174 is "yes" instead of "no," then the logic exits block 174 along a path 176 into a decisional block 178. In block 178, the algorithm tests to determine if the operator has requested, by means of button 132 on operator control panel 110, that the copy set be monitored. If not, the logic exits block 178 along a path 182, and the job is finished.

If the decision from decisional block 178 is "yes" instead of "no," then the logic exits block 178 along a path 184 into a function block 186. In a block 186, the image information signals generated in step 164 are compared to those generated in step 158, and an error signal representative of any differences therebetween is produced. In decisional block 188, the algorithm tests to determine whether the output of function block 186 indicates that the two information signals do not match. If the signals do match, the logic exits the decisional block along path 190, and the job is finished.

If the decision from decisional block 188 is "yes" instead of "no," then the logic exits block 188 along a path 192 into a decisional block 194. In decisional block 194, the algorithm tests to determine whether the output of function block 188 indicates that the two information signals do not match by an undesirable or unacceptable degree. By allowing for some, predetermined amount of mismatch, false indications of malfunction are avoided. If the signals are within a predetermined threshold, the logic exits the decisional block along path 196, and the job is finished.

If the decision from decisional block 194 is "no" instead of "yes," then the logic exits block 194 along a path 198 into a function block 200 to alert the operator to the situation via display 130.

Figure 4:
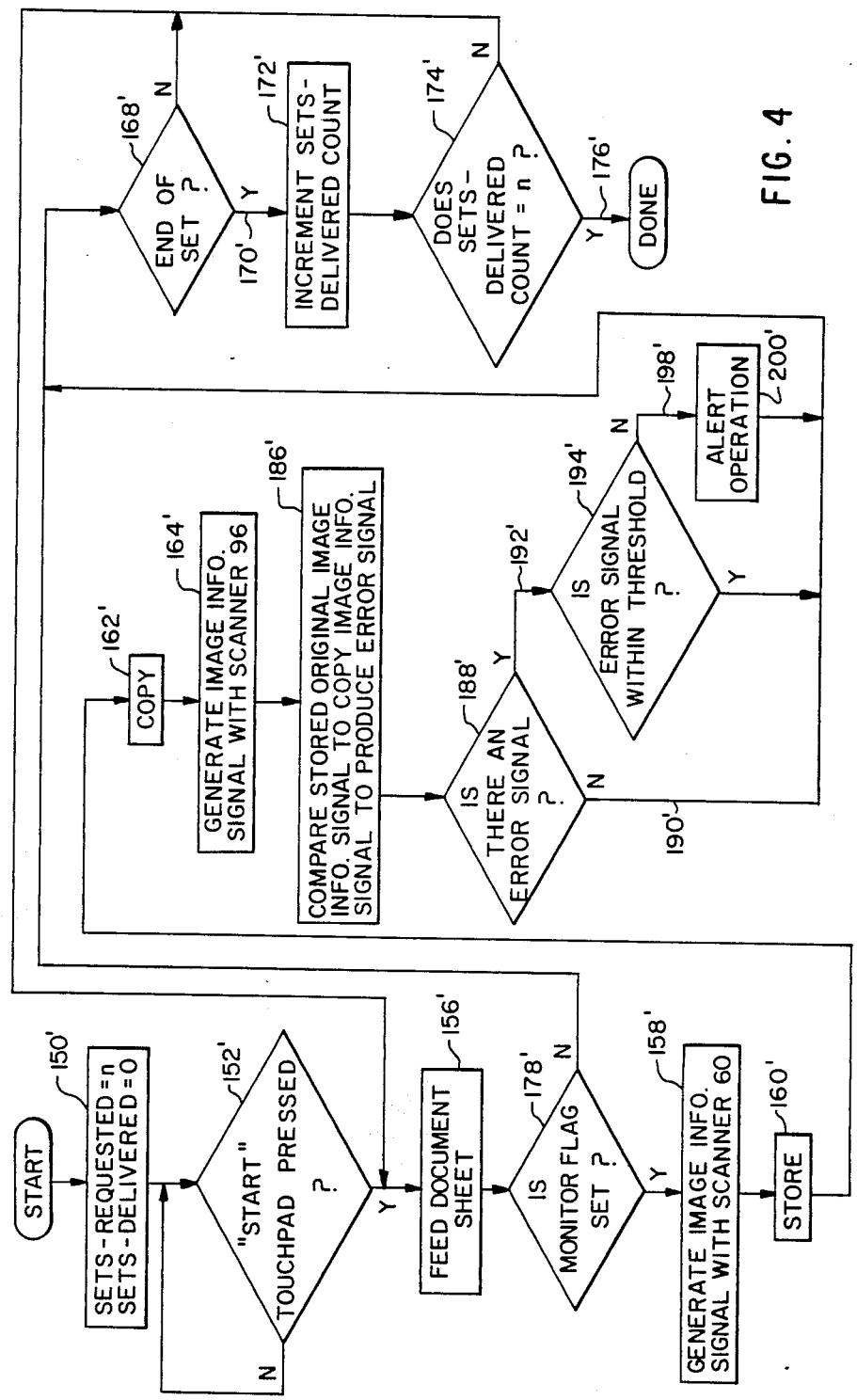
FIG. 4 is a flowchart of a second embodiment of the process by which the copies of FIG. 1 operates.

A second embodiment of an algorithm in accordance with the present invention is shown in FIG. 4. In the first algorithm described above, both the information signals characteristic of the images on the originals and the information signals characteristic of the images on the copies are stored in memory for subsequent comparison. In the FIG. 4 embodiment, only the information signals characteristic of the images on the originals are stored, and they are compared to the signals characteristic of the images on the copies in real time as the latter are produced. Storage of the original signals is required because several image frames will have gone past exposure station 70 between exposure and the production of a copy.

Another difference between the FIG. 3 embodiment and the FIG. 4 embodiment is the placement of the decision block inquiring if the monitor flag is set. By moving the block to an earlier position in the algorith, functions needed only for the monitoring operation can be left deactivated during operations not requiring them. For example, lamps can be turned off to increase their life, and scanners can be deactivated to save power.

In FIG. 4, a function block 150' requires that a request be made for a specific numer $\underline{n}$ of copy sets, and that the count of copy sets which have been delivered be reset to zero. A decisional block 152' causes the algorithm to await a command to begin. After the "start" touchpad is pressed (154 in FIG. 2), the algorithm enters a function block 156' and the bottom sheet of the original document set in circulating feeder is advanced to platen 28. In block 178', the algorithm tests to determine if the operator has requested, by means of button 132 on operator control panel 110, that the copy set be monitored. If not, the logic enters decisional block 168', and the system tests to determine whether each of the originals of the document set have been copied. If not, the algorithm loops up to function block 156'. The decision is made in a known manner such as by conventional set-separator finger 61.

If the decision from decisional block 168' is "yes" instead of "no," then the logic exits block 168' along a path 170' into a function block 172'. In block 172', the delivered-sets count is incremented, and is used in a decisional block 174' to determine if the desired number of copy sets have been made. If not the algorithm loops up to function block 156'. If the decision from decisional block 174' is "yes" instead of "no," then the logic exits block 174' along a path 176', and the job is finished.

If the decision from decisional block 178' is "yes" instead of "no," then the logic exits block 178' into a function block 158'. An electrical image information signal is generated as the sheet passes scanner 60, as depicted by a logic function block 158'. Function block 160' stores the signal in temporary memory 112.

The algorithm enters a function block 162', and the original is copied, with scanner 96 generating an electrical image information signal of the copy sheet as specified by a function block 164'.

In a block 186', the image information signals stored in step 160' are compared to those generated in step 164', and an error signal representative of any differences therebetween is produced. In decisional block 188', the algorithm tests to determine whether the output of function block 186' indicates that the two information signals do not match. If the signals do match, the logic exits the decisional block along path 190 to decisional block 186'.

If the decision from decisional block 188' is "yes" instead of "no," then the logic exits block 188' along a path 192' into a decisional block 194'. In decisional block 194', the algorithm tests to determine whether the output of function block 186' indicates that the two information signals do not match by an undesirable or unacceptable degree.

If the decisiion from decisional block 194' is "no" instead of "yes," then the logic exits block 194' along a path 198' into a function block 200' to alert the operator to the situation via display 130. Operator alert may also be by means adapted to identify the bad copy set to the operator. For example, a color cover sheet might be inserted on top of the set.

By the present invention, of which a preferred embodiments have been described herein, apparatus and a process is provided to decide when a copy set contains a poorly reproduced page or pages, has a duplicate sheet, does not contain all of the sheets, or has a blank sheet or sheets.

The invention has been described in detail with particular reference to preferred embodiments thereof, but it will be understood that variations and modifications can be effected within the spirit and scope of the invention.

What is claimed is:

1. In a copier for producing multi-sheet, collated copy sets of a multi-original document, apparatus for monitoring the copy sets for skipped skewed, unwanted, duplicate, or blank sheets, said apparatus comprising:
    means for receiving high resolution electrical information signals characteristic of the images on the originals;
    means for creating a second, low resolution electrical information signal characteristic of the images on the copy set sheets;
    means for comparing said second electrical information signal with the first electrical information signal to produce an error signal representative of differences therebetween; and
    means responsive to error signals for indicating a malfunction of the copier.

2. Apparatus as set forth in claim 1 further comprising means for electronically storing the first electrical information signal for subsequent comparison with the second electrical information signal.

3. Apparatus as set forth in claim 2 further comprising means for electronically storing the second electrical information signal for subsequent comparison with the stored first electrical information signal.

4. Apparatus as set forth in claim 1 wherein said means for indicating a malfunction of the copier is responsive only to error signals of at least a predetermined magnitude, whereby false indications of malfunction are avoided.

5. In a copier for producing multi-sheet, collated copy sets of a multi-original document, apparatus for monitoring the copy sets for skipped, skewed, unwanted, duplicate, or blank sheets, said apparatus comprising:
    means for producing high resolution electrical information signals characteristic of the images on the originals;
    low resolution scanner means for producing second low resolution electrical information signal characteristic of the images on the copy set sheets;
    means for comparing said second electrical information signal with the first electrical information signal to produce an error signal representative of differences therebetween; and
    means responsive to error signals for indicating a malfunction of the copier.

6. A process for monitoring collated high resolution copy sets produced from a multi-original document for confirming that each copy set contains all of the sheets, and has no grossly skewed, or unwanted duplicate or blank sheets, said process comprising the steps of:
    creating a first electrical high resolution information signal characteristic of the images on the originals;
    creating a second electrical low resolution signal characteristic of the images on the copy set sheets;
    comparing said second electrical information signal with the first electrical information signal;
    producing an error signal representative of differences between the first and second electrical information signals; and
    indicating a malfunction of the copier in response to the error signals.

7. The process set forth in claim 6 further comprising the step of electronically storing the first electrical information signal for subsequent comparison with the second electrical information signal.

8. The process set forth in claim 7 further comprising the step of electronically storing the second electrical information signal for subsequent comparison with the stored first electrical information signal.

* * * * *